United States Patent
Heller et al.

(10) Patent No.: US 8,271,172 B2
(45) Date of Patent: Sep. 18, 2012

(54) PRESSURE-CONTROLLED HYDRAULIC BRAKE SYSTEM FOR A LAND CRAFT

(75) Inventors: Frank Heller, Boppard (DE); Josef Knechtges, Mayen (DE); Thorsten Sopp, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 766 days.

(21) Appl. No.: 11/921,877

(22) PCT Filed: Jun. 8, 2006

(86) PCT No.: PCT/EP2006/005493
§ 371 (c)(1),
(2), (4) Date: Jun. 14, 2009

(87) PCT Pub. No.: WO2006/131368
PCT Pub. Date: Dec. 14, 2006

(65) Prior Publication Data
US 2009/0299597 A1      Dec. 3, 2009

(30) Foreign Application Priority Data
Jun. 9, 2005   (DE) .................. 10 2005 026 740

(51) Int. Cl.
*G06G 7/00* (2006.01)
(52) U.S. Cl. ........................................... 701/70
(58) Field of Classification Search ............. 701/70, 701/71, 78, 79, 83
See application file for complete search history.

(56) References Cited

U.S. PATENT DOCUMENTS

| | | | | |
|---|---|---|---|---|
| 5,494,345 | A * | 2/1996 | Inagaki et al. | 303/163 |
| 6,030,055 | A * | 2/2000 | Schubert | 303/113.4 |
| 6,082,830 | A | 7/2000 | Volz et al. | |
| 2001/0009880 | A1 * | 7/2001 | Suzuki et al. | 475/122 |

FOREIGN PATENT DOCUMENTS

| | | |
|---|---|---|
| DE | 36 24 344 A1 | 1/1988 |
| DE | 40 02 865 A1 | 8/1991 |
| DE | 44 39 890 A1 | 5/1996 |
| DE | 195 25 800 A1 | 1/1997 |
| EP | 0 928 730 A1 | 7/1999 |
| WO | WO 93/22169 | 11/1993 |
| WO | WO 94/27848 | 12/1994 |
| WO | WO 95/19282 | 7/1995 |
| WO | WO 96/10507 | 4/1996 |

* cited by examiner

*Primary Examiner* — Kim T Nguyen
(74) *Attorney, Agent, or Firm* — MacMillan, Sobanski & Todd, LLC

(57) ABSTRACT

Hydraulic brake system for a land vehicle includes a control unit that supplies control signals for controlling automatic braking operations of the brake system, a master cylinder for generating brake pressure under the control of a driver, a first brake circuit includes a first controllable pump for generating brake pressure in the first brake circuit under the control of the control unit, and a first valve arrangement having an input side, which is fluidically connected to the master cylinder, and an output side, which is fluidically connected to the first pump, wherein the first valve arrangement has an open operating state, in which the input side and the output side of the first valve arrangement are fluidically connected, and a closed operating state, in which the fluid connection between the input side and the output side of the first valve arrangement is interrupted.

26 Claims, 2 Drawing Sheets

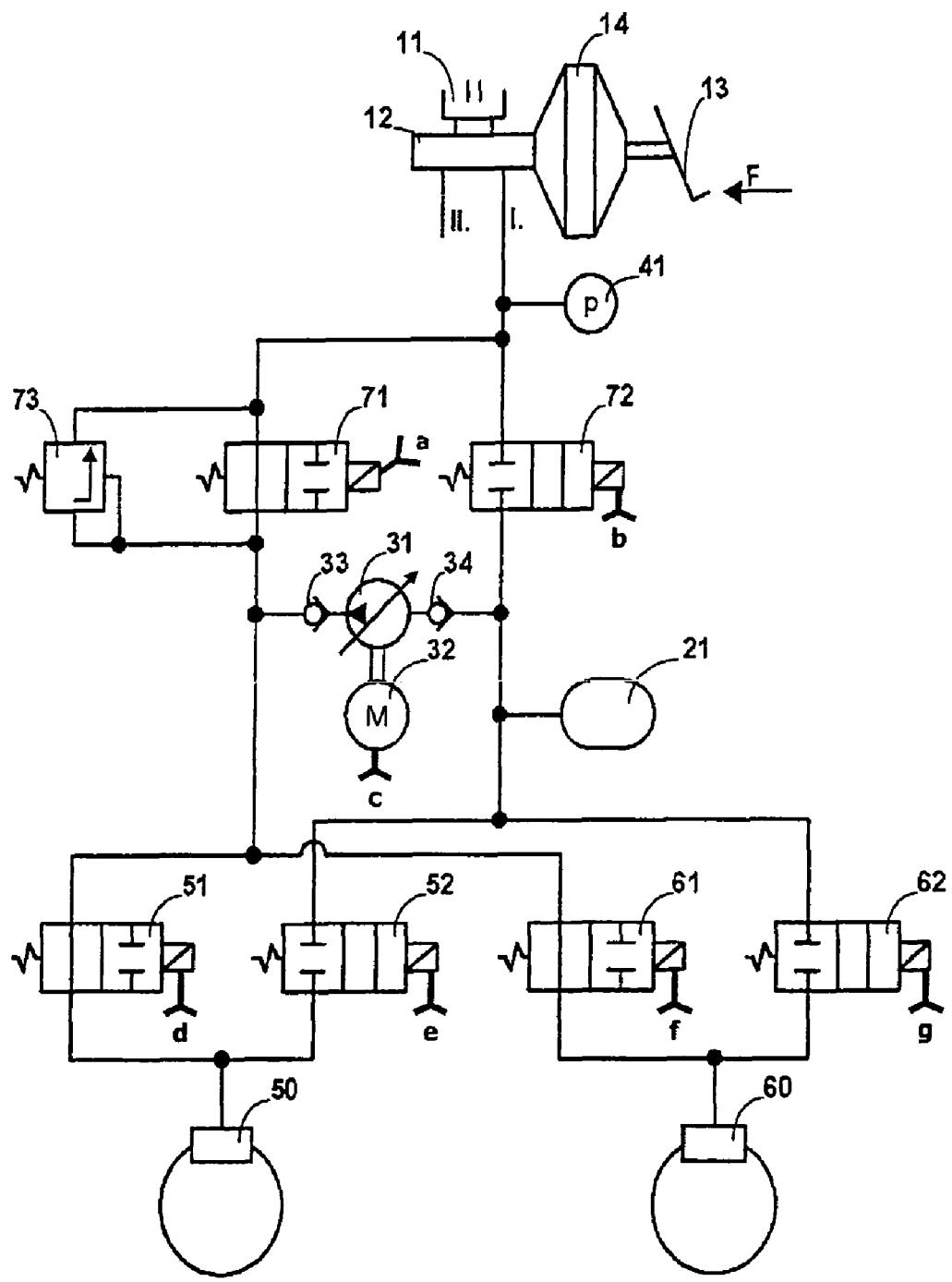
Fig. 1
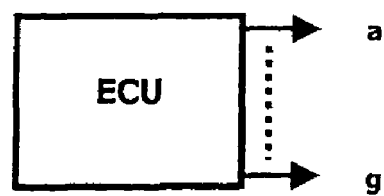

PRESSURE-CONTROLLED HYDRAULIC BRAKE SYSTEM FOR A LAND CRAFT

CROSS-REFERENCE TO RELATED APPLICATIONS

This application is a National Stage of International Application No. PCT/EP2006/005493 filed Jun. 8, 2006, the disclosures of which are incorporated herein by reference, and which claimed priority to German Patent Application No. 10 2005 026 740.8 filed Jun. 9, 2005, the disclosures of which are incorporated herein by reference.

BACKGROUND OF THE INVENTION

The present invention relates in general to hydraulic brake systems for land vehicles and in particular to a brake system and to a brake system control method for pressure control during automatic braking operations.

Hydraulic brake systems for land vehicles may be devised in such a way that, in addition to driver-controlled braking operations, they may carry out automatic braking operations that occur independently of an actuation of the brake system by the driver. Examples of such automatic braking operations include braking operations for acceleration spin regulation (ASR) that prevent individual wheels from spinning during the starting operation by targeted braking of the corresponding wheels, braking operations for an electronic stability program, whereby vehicle behaviour is controlled in extreme ranges by targeted braking of individual wheels, and braking operations for adaptive cruise control, in which for example through automatic braking of the vehicle defined speeds and/or distances from vehicles travelling in front are maintained.

Automatic braking operations are to occur in such a way that they are not perceived by the driver and/or do not cause any unwanted vehicle movements (for example jolting and/or pulling of the vehicle). These aims are difficult to achieve for several reasons.

Automatic braking operations conventionally run off at low brake pressures. In this case, interfering influences, such as for example unequal clearances between brake pistons and brake linings, unevenly worn brake linings, displaced brake pistons and/or brake linings etc., come particularly into play. During the operation of hydraulic brake systems having two brake circuits, such interfering influences are compensated during driver-controlled braking operations in that pressure equalization is possible between the brake circuits. This compensation is not available during automatic braking operations because in this case the two brake circuits are hydraulically separate from one another. Instead, during automatic braking operations both in brake systems having one brake circuit and in brake systems having two or more brake circuits it is necessary to compensate interfering influences separately for each brake circuit.

In order to allow automatic braking operations to run off comfortably, for example without jerky movements and/or pulling of the vehicle, it is desirable for the brake pressures, which exist in the brake circuits and produce the braking effect, to be adjusted as precisely as possible.

SUMMARY OF THE INVENTION

One advantage of one embodiment of the present invention is more precise adjustment of the brake pressure in individual brake circuits of hydraulic brake systems during automatic braking operations.

To achieve the above object, the present invention provides a brake system and a method according to the independent claims.

The master cylinder has an output side and is provided for generating brake pressure under the control of a driver, for example through actuation of a brake pedal that interacts with the master cylinder.

The first brake circuit comprises a first controllable pump and a first valve arrangement.

The first controllable pump has an input side and is provided for generating brake pressure in the first brake circuit under the control of the control unit.

The first valve arrangement has an input side, which is fluidically connected to the output side of the master cylinder, and an output side, which is fluidically connected to the output side of the first pump. The first valve arrangement may adopt an open operating state, in which the input side and the output side of the first valve arrangement are fluidically connected, and a closed operating state, in which the fluid connection between the input side and the output side of the first valve arrangement is interrupted or blocked.

According to the invention the control unit is devised such that during an automatic braking operation it supplies control signals for the first valve arrangement in order to bring the first valve arrangement in such a way into its open and closed operating states that a predetermined pressure is adjusted at the output side of the first valve arrangement.

Preferably, the first valve arrangement comprises a valve arrangement according to DE 44 39 890 A1.

Preferably, the control unit allows control of the first valve arrangement by means of pulse width modulation (PWM). Given the use of pulse width modulation, a signal pulse may bring the first valve arrangement into one of its operating states, while a signal interpulse period brings the first valve arrangement into its other operating state. In this case, the ratios of signal pulses and time periods without a signal, in short the pulse/interpulse period ratio may be set in such a way that the predetermined pressure is adjusted at the output side of the first valve arrangement.

Preferably, the control unit is devised such that in response to the automatic braking operation, i.e. at the start of an automatic pressure control in the first brake circuit, it supplies control signals that bring the first valve arrangement into its closed operating state for a predetermined first time period. Given the use of pulse width modulation, this may be achieved by one or more so-called "initial bursts" that may correspond to a pulse width modulation of 100%.

It is further provided that the control unit during the automatic braking operation supplies a sequence of control signals that brings the first valve arrangement alternately into its open and closed operating states. In this case, it is preferred that the control signal sequence is supplied in the form of high-frequency control signals. In the case of pulse width modulation, this may be effected for example by means of so-called "dither bursts", which comprise high-frequency signal pulses. In this case, the pulse/interpulse period ratio of the pulse width modulation may advantageously be adjusted and/or varied in accordance with predetermined signal characteristics. The signal characteristics may be both continuous and present stepped changes, wherein the individual signal characteristics as such may be for example linear, sinusoidal, rectangular, triangular or saw-tooth. Thus, by means of a sinusoidal signal characteristic it is possible to achieve a so-called "sweep", by means of which the noise level during the pressure adjustment by the first valve arrangement is reduced.

Here, it is further provided that the initially described control signals for the first valve arrangement and the control signals of the control signal sequence are superimposed. It is then possible to achieve a reciprocating movement or a so-called "shuttle" movement of the first valve arrangement that may prevent for example binding and/or jamming effects and/or hystereses.

The control unit is preferably further devised such that during the automatic braking operation it supplies control signals that bring the first valve arrangement into its closed operating state at predetermined time intervals for a second predetermined time period. In the case of pulse width modulation, this may be effected by so-called "safety bursts", which comprise signal pulses with a pulse width modulation of 100% at the predetermined time intervals for the second predetermined time period. Particularly given low brake pressures in the first brake circuit during implementation of the automatic braking operation, this procedure makes it possible to counteract pressure drops that may be caused for example by pulsations at the output side of the first pump. A "safety burst" is therefore used particularly when the pressure difference at the first valve arrangement falls below a predetermined limit value, the so-called "pop-off" value, in order to prevent an unwanted opening of the first valve arrangement.

Preferably, the first valve device adopts its open operating state when there is a predetermined upper pressure difference between its output side and its input side.

This may be achieved by a corresponding design of the first valve device. If the first valve arrangement for example comprises a valve arrangement according to DE 44 39 890 A1, this may be achieved by a corresponding dimensioning of force-generating components in this valve arrangement.

Additionally or alternatively this may be achieved by the control unit supplying corresponding control signals.

This procedure may be understood as limiting the operating range of the first valve arrangement to the effect that the first valve device up to the predetermined upper pressure difference between its output and input sides may be controlled in the manner explained above. For example, the predetermined upper pressure difference may be 130 bar. Given the use of a pulse width modulation that is variable from, say, 20% to 100%, it is then possible to realize a precise pressure control in the first brake circuit that is able to guarantee comfortably running automatic braking operations.

If during the automatic braking operation an actuation of the brake system by the driver occurs in such a way that a discontinuation or termination of the automatic braking operation is necessary or appears necessary (for example because of an emergency braking operation), the control unit may on the one hand supply control signals for the first valve arrangement, in order to bring the first valve arrangement into its open operating state, and on the other hand supply control signals for the brake system, in order to terminate the automatic braking operation. Since the first valve arrangement is brought into its open operating state, it is possible for brake pressure generated by the driver in the master cylinder to be supplied to the first brake circuit.

If the brake system is actuated by the driver in such a way that the automatic braking operation is not to be terminated (for example in the event of brief, accidental actuation of the brake pedal), it is possible that the actuation by the driver generates brake pressures at the input side of the first valve arrangement that may influence the pressure at the output side of the first valve arrangement. To prevent this, it may be provided that the control unit in such situations brings the first valve arrangement in such a way into its open and closed operating states that an actuation of the brake system by the driver does not result in a pressure change at the output side of the first valve arrangement. Preferably, the first valve arrangement in such a situation is brought into its closed operating state and is preferably held there until repercussions from the brake pressure of the driver may be ruled out.

Preferably, the control unit is further devised such that during the automatic braking operation it controls the first pump in such a way that the first pump delivers hydraulic fluid in dependence upon the actual pressure at the output side of the first valve arrangement. This may be regarded as fine regulation that improves the pressure control according to the invention. The control of the first pump may be effected in the present case for example by a corresponding activation of a motor provided for operation of the first pump.

Preferably, the brake system comprises at least one pressure sensor, which is capable of supplying pressure signals that provide information about an actual pressure that is relevant to the output side of the first valve arrangement. In this case, it is further provided that the control unit controls the first valve arrangement in dependence upon the pressure signals.

The at least one pressure sensor may be used for pressure acquisition at the output side of the first pump and/or at an input side and/or in a wheel brake of the brake system.

In a further preferred form of construction, the brake system comprises a brake circuit comprising a second controllable pump and a second valve arrangement. The above explanations regarding the first pump and first valve arrangement similarly apply to the second pump and the second valve arrangement.

According to the invention, given such a brake system it is provided that the control unit is capable of controlling both the first valve arrangement and the second valve arrangement in such a way that they each adopt their open and closed operating states in such a way that the predetermined pressure is adjusted at the output side of the first valve arrangement and at the output side of the second valve arrangement.

In this case, it is possible that the pressure at the output side of the first valve arrangement is defined as the predetermined pressure for both brake circuits or that the pressure at the output side of the second valve arrangement is defined as the predetermined pressure for both brake circuits. It is further possible to define the predetermined pressure in dependence upon the respective pressures at the output sides of the valve arrangements, for example using weighting factors.

The method according to the invention is provided for controlling a hydraulic brake system for a land vehicle that has the initially described features. In the method, during an automatic braking operation the first valve arrangement is controlled in such a way that a fluid connection between the input side and the output side of the first valve arrangement is established and blocked in such a controlled manner that a predetermined pressure is adjusted at the output side of the first valve arrangement.

Preferred forms of implementation of the method according to the invention are defined in corresponding dependent claims. Advantages of this invention will become apparent to those skilled in the art from the following detailed description of the preferred embodiments, when read in light of the accompanying drawings.

BRIEF DESCRIPTION OF THE DRAWINGS

In the following description of preferred embodiments reference is made to the accompanying figures, which show:

FIG. 1 a diagrammatic representation of a brake system according to the invention in an operating state for at least partially driver-controlled braking operations, and FIG. 2 a diagrammatic representation of a brake system according to the invention in an operating state for automatic braking operations.

DETAILED DESCRIPTION

Figure 2:
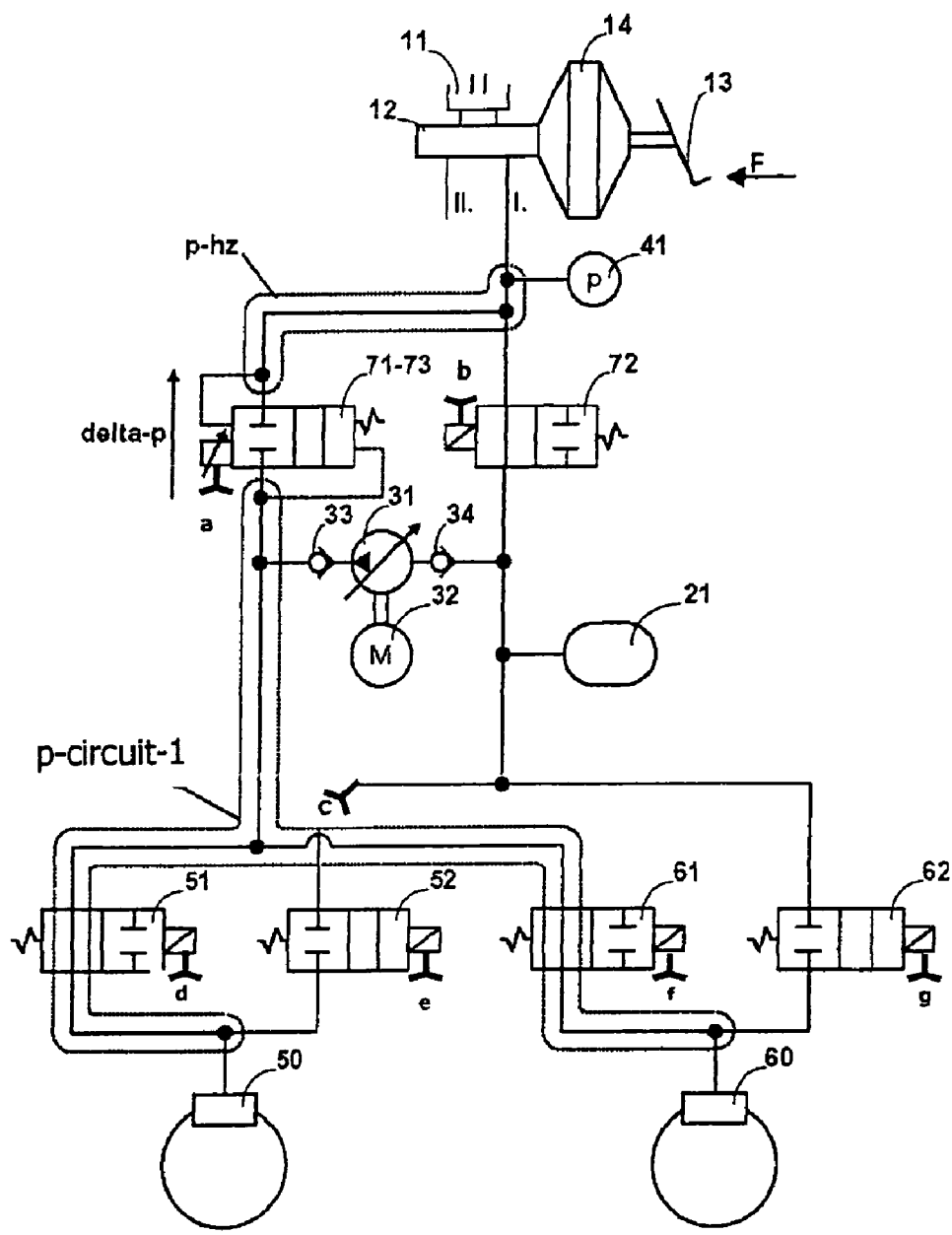
Figure 2:
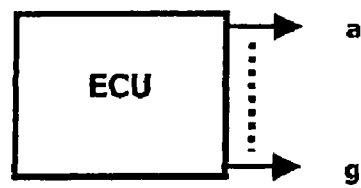

FIGS. 1 and 2 show diagrammatic representations of brake systems. The following explanations regarding the embodiment of FIG. 1 similarly apply to the embodiment of FIG. 2.

The brake system operates by means of hydraulic fluid that is stored in part in a tank 11. To generate brake pressure, which arises by pressurizing the hydraulic fluid, a master cylinder 12 is used, which may be actuated by the driver by means of a pedal 13. As is represented in the figures, it is optionally possible to provide a brake booster 14 between the master cylinder 12 and the pedal 13 in order to boost—preferably pneumatically or hydraulically—a force F that is introduced by the driver.

From the master cylinder 12 a first and second brake circuit I, II are supplied, wherein each brake circuit comprises two wheel brakes. Depending on which wheel brakes of the vehicle are contained in which brake circuit, there is a resulting split between front and rear axle, wherein one brake circuit may comprise wheel brakes of the front axle and the other brake circuit wheel brakes of the rear axle or one brake circuit may comprise the wheel brake of a front wheel and the wheel brake of the diagonally opposite rear wheel and the other brake circuit may comprise the wheel brakes of the other front wheel and the other rear wheel.

In the following it is assumed that the brake circuits I, II are substantially identical in construction. For this reason, only the brake circuit I is shown in detail. The following explanations regarding the brake circuit I similarly apply to the brake circuit II.

The brake circuit I comprises two wheel brakes 50 and 60. For controlling brake pressure characteristics in the wheel brakes 50 and 60, a first valve arrangement comprising valves 51 and 52 and a second valve arrangement comprising valves 61 and 62 are provided.

The valves 51, 52, 61 and 62 are represented here as 2/2-way valves that are actuable by electromagnets.

The brake circuit I comprises a valve device comprising valves 71, 72 and 73. The valves 71 and 72 are represented here as 2/2-way valves that are actuable by electromagnets.

FIG. 1 shows the valves 51, 61 and 71 each in an open operating state or flow position, while the valves 52, 62 and 72 are shown each in a closed operating state or blocked position. These operating states or positions are referred to below also as basic position.

In the operating state of the brake circuit I represented in FIG. 1, because of the open operating state of the valve 71 a hydraulic connection exists between the master cylinder 12 and the wheel brakes 50 and 60. This operating state is used for braking operations that are controllable by actuations of the pedal 13 and may also be described as normal braking operations. Actuations of the master cylinder 12 by means of the pedal 13, optionally with the cooperation of the brake booster 14, generate brake pressures in the brake circuit I and hence in the wheel brakes 50 and 60.

The illustrated brake system is designed for so-called anti-lock control, whereby locking of the wheels is to be prevented during a braking operation. For this purpose, brake pressures effective in the wheel brakes 50 and 60 are individually modulated. This occurs by adjusting pressure build-up, pressure keeping and pressure reduction phases, which alternate in a time sequence and are explained in more detail below.

The pressure build-up, pressure keeping and pressure reduction phases are achieved by suitable control of the valves 51, 52 and 61, 62, which are associated with the wheel brakes 50 and 60 respectively, by means of an electronic control unit ECU.

The electronic control unit ECU via a row of non-illustrated inputs may receive signals that indicate operating states of a vehicle. For example, it is provided that signals of wheel speed sensors, yaw rate sensors, transverse acceleration sensors etc., are supplied to the electronic control unit ECU.

The electronic control unit ECU has outputs for control signals a, . . . , g for controlling the valves 51, 52, 61, 62, 71 and 72 as well as for controlling a motor 32 provided for operation of a pump 31.

In the case of a driver-controlled normal braking operation with anti-lock control, control is effected by the electronic control unit ECU in dependence upon measured variables indicating operating states of the vehicle (for example speed, acceleration, wheel speeds, yaw rate, transverse acceleration etc.) and measured variables indicating a braking operation requested by the driver (for example actuation of the pedal 13, hydraulic pressure at the output of the master cylinder 12 etc.). The braking operation requested by the driver may also be determined by means of the brake pressure P, which is generated in the master cylinder 12 and for the acquisition of which a sensor 41 is provided.

During a normal braking operation without anti-lock control the valves 51, 52 and 61, 62 are situated each in their basic position. If the electronic control unit ECU for example establishes that wheels associated with the wheel brakes 50 and 60 have a tendency to lock or are locking, the electronic control unit ECU arranges a pressure keeping phase for each of the wheel brakes 50 and 60. If the pressure keeping phases do not result in termination of the tendency to lock or the locking, the electronic control unit ECU arranges a pressure reduction phase for each of the wheel brakes 50 and 60 until the tendency to lock or the locking is terminated. This is then followed, under the control of the electronic control unit ECU, by pressure build-up phases for the wheel brakes 50 and 60, during which the brake pressure effective in the wheel brakes 50 and 60 are built up in accordance with the braking operation requested by the driver.

During the pressure keeping phases the valves 51 and 61 under the control of the electronic control unit ECU are each brought into a closed operating position or blocked setting. The valves 52 and 62 in this case remain in the basic positions that they occupy during the normal braking operation.

The closing of the valves 51 and 61 leads to a hydraulic uncoupling of the wheel brakes 50 and 60, with the result that the brake pressures effective in the wheel brakes 50 and 60 are kept constant.

During the pressure reduction phases the valves 51 and 61 are held in their closed operating positions and the valves 52 and 62 are activated by the electronic control unit ECU in such a way that they each adopt an open operating state or flow position. Because of the open valves 52 and 62 hydraulic fluid may flow out of the wheel brakes 50 and 60, thereby reducing the brake pressures in the wheel brakes 50 and 60. Hydraulic fluid flowing off in this case may be stored temporarily in a low-pressure receiver 21.

During a pressure build-up phase the valves 51, 52 and 61 and 62 adopt their basic positions, i.e. the valves 51 and 61 are opened by the electronic control unit ECU, while the valves 52 and 62 are closed. To increase the brake pressures in the wheel brakes 50 and 60 that were reduced during the pressure reduction phases, the electronic control unit ECU activates the motor 32 and hence the pump 31 in such a way that via the valves 51 and 61 the brake pressures effective in the wheel brakes 50 and 60 are increased to the level corresponding to the braking operation requested by the driver. In this case, the pump 31 effects return delivery of hydraulic fluid that has flowed off during the pressure reduction phases, optionally out of the low-pressure receiver 21.

The pump 31 designed for example as a radial piston pump blocks counter to its delivery direction, for example by means of a non-return valve 33 at the output of the pump 31 and a non-return valve 34 at the input of the pump 31.

The rotational speed of the electric motor 32 is adjustable and/or controllable by means of the control signal c of the electronic control unit ECU, thereby allowing the delivery rate of the pump 31 to be controlled. The electric motor 32 may simultaneously actuate a pump (not shown here) of the second brake circuit II.

Automatic braking operations generally occur independently of a force F introduced by the driver at the pedal 13. Such automatic braking operations occur for example in acceleration spin regulation (ASR), which prevents individual wheels from spinning during a starting operation by targeted braking, in an electronic stability program (ESP), which adapts the vehicle behaviour to the request of the driver and the road conditions in extreme ranges through targeted braking of individual wheels, or in adaptive cruise control (ACC), whereby by means of i.a. automatic braking a distance of the actual vehicle from a vehicle travelling in front is maintained.

For an automatic braking operation the valves 71 and 72 are activated by the electronic control unit ECU in such a way that the valve 71 adopts a closed operating state or a blocked position and the valve 72 adopts an open operating state or a flow position. The valves 51, 52, 61 and 62 in this case remain in their basic positions. Because of the closed valve 71, the open valves 51 and 61 and the closed valves 52 and 62, the wheel brakes 50 and 60 are uncoupled to such an extent from the master cylinder 12 and/or the brake circuit II that no externally supplied brake pressures, i.e. brake pressures generated by actuation of the pedal 13, may be supplied. Nor does the open valve 72 allow a supply of external brake pressure because the valves 52 and 62 are closed and the pump 31 likewise acts like a closed valve. The open valve 72 does however allow the pump 31 to take in hydraulic fluid also from the tank 11 in order to generate brake pressures in the wheel brakes 50 and 60 in the manner described in detail below.

In order to generate braking forces required for automatic braking operations in the wheel brakes 50 and 60, the electronic control unit ECU controls the motor 32 and/or the pump 31 in a corresponding manner. For modulation or for fine adjustment of the brake pressures in the wheel brakes 50 and 60, the electronic control unit ECU may control the valves 51, 52 and/or 61, 62 in a manner comparable to the previously described anti-lock control.

To prevent damage of the brake circuit I, the valve 73 may be provided in the form of a pressure relief valve. The valve 73, which is normally in a closed operating state, adopts an open operating state that reduces brake pressure when there is too high a pressure at the output of the pump 31.

Automatic braking operations generally occur at low brake pressures. In this case, interfering influences that may lead to different braking effects at wheels can have a particularly adverse effect. During normal braking operations such interfering influences are at least partially compensated in that between the brake circuits I and II there is a hydraulic connection that provides a pressure equalization in the master cylinder 12 according to the floating piston principle. This is not possible during automatic braking operations on account of the closed valve 71 of the brake circuit I and a corresponding, likewise closed valve of the brake circuit II.

Automatic braking operations conventionally run off at low brake pressures, the adjustment of which should be effected as precisely as possible in order to allow comfortable implementation of automatic braking operations. One problem with this is that in automatic braking operations the brake force(s) of a brake system are hydraulically separate or uncoupled from the master cylinder. As a result, hydraulic compensation operations via the master cylinder and a hydraulic fluid receiver connected thereto and, where provided, a further brake circuit, for example according to the floating piston principle, are not possible.

According to the invention this problem is solved generally in that the valves 71 and 73 or valve arrangements providing their functions are used for pressure control during automatic braking operations.

FIG. 2 shows a brake system according to the invention in an operating state for an automatic braking operation. The following explanations regarding the brake circuit I also similarly apply to the brake circuit II. According to FIG. 2 the valve 72 is open so that the pump 31 is able to take in hydraulic fluid from the hydraulic fluid tank 11 and therefore generate a brake pressure p-circuit-1 in the brake circuit I and in particular in the wheel brakes 50 and 60.

According to FIG. 2 the valve 71 and the pressure relief valve 73 are integrated as a structural unit in a valve arrangement denoted by 71-73. Such a valve arrangement is known from DE 44 39 890 C2.

In FIG. 2 the valve arrangement 71-73 is shown in a closed operating state or a blocked position. Here, it is assumed that this operating state is achieved by electrical activation by the control unit ECU. On the other hand, it is correspondingly assumed that an open operating state or a flow position of the valve arrangement 71-73 is adopted and/or exists when the valve arrangement 71-73 is not electrically activated by the control unit ECU; this may be achieved for example by servo and/or resetting means (for example springs) that are provided in the valve arrangement 71-73, bring the valve arrangement 71-73 into its open operating state and hold it there till the next activation.

The valve arrangement 71-73 conventionally adopts its open operating state or its flow position when between its input side connected to the master cylinder 12 and its output side connected to the output side of the pump 31 there is a predetermined, maximum pressure difference delta-p. If this pressure difference is reached and/or exceeded, the components of the valve arrangement 71-73 that provide the functions of the pressure relief valve 73 cause the valve arrangement 71-73 to open automatically even though the control unit ECU should electrically activate the valve arrangement 71-73.

For pressure control during automatic braking operations, the flow characteristic of the valve arrangement 71-73 is controlled by means of the control unit ECU. For this purpose, the control unit ECU may use pulse width modulation (PWM), i.e. signals, with an adjustable ratio of signal pulse duration and time period without a signal pulse. By adjusting this pulse/interpulse period ratio, the flow characteristic of the valve arrangement 71-73 and/or the pressure difference delta-p that determines the pressure relief function of the valve arrangement 71-73 may be controlled as a function of the pulse width modulation. This may be indicated by the following equation:

$$\text{delta-p} = f(\text{PWM})$$

In this case, the pressure difference delta-p indicates the difference of the brake pressure p-circuit 1, which exists at the output side of the pump 31 and/or at the output side of the valve arrangement 71-73 connected thereto, and the pressure p-hz, which exists at the output side of the master cylinder 12 and/or at the input side of the valve arrangement 71-73 connected thereto. This may be indicated by the following equation:

$$\text{delta-p} = \text{p-circuit-1} - \text{p-hz}$$

By means of advantageously continuous control of the pressure difference delta-p, which is relevant to the pressure relief function and/or flow characteristic of the valve arrangement 71-73, the brake pressure p-circuit-1 may likewise be preferably continuously controlled during an automatic braking operation. This is effected by an activation of the valve arrangement 71-73 by the control unit ECU that is modified compared to known activations of the valve arrangement 71-73 and/or comparable valve arrangements. In particular the following activations are provided.

If an automatic braking operation is initiated, then, as explained above, the valves 51, 61 and 72 are brought into their open operating states and/or flow positions and the valves 52 and 62 are brought into their closed operating states and/or blocked positions. In a manner comparable to the valves 71 and 73 of FIG. 1, the valve arrangement 71-73 is activated in such a way that the fluid connection between the output side of the master cylinder 12 and the output side of the pump 31 is blocked. This may be achieved by continuous activation of the valve arrangement 71-73 by the control unit ECU, for example with a pulse width modulation of 100%. The effect of this activation is that the valve arrangement 71-73 definitively adopts its closed operating state and/or blocked position. This activation is provided for a time period up to attainment of a brake pressure p-circuit-1, which corresponds at least approximately to a brake pressure predetermined for the automatic braking operation. As the length of time taken for this is short, this activation may also be described as an "initial burst".

After this initial activation of the valve arrangement 71-73 it is provided that the activation on the part of the control unit ECU in particular by means of pulse width modulation is carried out in such a way that the valve arrangement 71-73 opens when the brake pressure p-circuit-1 is too high and closes when, in order to achieve the predetermined brake pressure, the brake pressure p-circuit-1 is to be increased.

It is further provided that the valve arrangement 71-73 is activated in such a way that the pressure difference delta-p existing in each case gives rise to a reciprocating or "shuttle" movement of movable parts of the valve arrangement 71-73 in such a way that the valve arrangement 71-73 opens and closes. This may be achieved by high-frequency activation of the valve arrangement 71-73 on the part of the control unit ECU, for example by high-frequency signal pulses, which may also be described as "dither bursts". This activation may prevent hystereses as well as binding or jamming effects and is advantageously superimposed on the previously described activation for adjusting the brake pressure p-circuit-1.

It is further provided that the control unit ECU activates the valve arrangement 71-73 in such a way that it preferably temporarily definitively adopts its closed operating state and/or blocked position. This may be effected by continuous activation provided for a corresponding period of time, for example by means of a pulse width modulation of 100%. This activation may be effected at predetermined time intervals, particularly when the brake pressure p-circuit-1 is to be adjusted to a low value, in order for example to counteract a pressure drop that may arise because of pulsations at the output side of the pump 31, which may lead to unwanted opening. This activation, which may also be described as a "safety burst", may be achieved for example by a pulse-shaped activation with pulse width modulation of 100%.

In addition to the previously described measures it is provided that the operating range of the valve arrangement is limited. For example, a pressure difference delta-p of approximately 130 bar may be predetermined, upon the exceeding of which the valve arrangement 71-73 reliably opens in order to prevent damage, while given pressure differences delta-p below this predetermined limit a precise control of the brake pressure p-circuit-1, for example with a pulse width modulation adjustable from approximately 20% to 100%, may be carried out in order to guarantee optimized, comfortably running automatic braking operations.

It has hitherto been assumed that during the automatic braking operation no actuation of the brake system by the driver occurs. In order to guarantee reliable operation also in the event of actuation of the brake system by the driver during the automatic braking operation, the following is provided.

First, upon actuation of the brake system by the driver it is determined whether the actual actuation indicates an actual braking request by the driver or not. This may be determined for example from the intensity and/or speed and/or duration of the actuation of the brake pedal 13 and/or brake pressures p-hz generated at the output side of the master cylinder 12.

If the driver unintentionally, inadvertently, briefly actuates the brake system, influences of the automatic braking operation as a result of brake pressures p-hz consequently generated at the output side of the master cylinder 12 are prevented in that the valve arrangement 71-73 adopts its closed operating state and/or blocked position so long as possibly interfering brake pressures p-hz exist.

If the driver actuates the brake system in such a way that an actual braking request of the driver may be assumed, the automatic braking operation and hence the pressure control by means of the valve arrangement 71-73 is terminated or at least interrupted by the control unit ECU.

The control of the pressure p-circuit-1 may in addition to the control by means of the valve arrangement 71-73 be assisted by controlling the quantity of hydraulic fluid delivered by the pump 31 by corresponding activation of the motor 32. This may be effected continuously or if the pressure control by means of the valve arrangement 71-73 is occurring too slowly.

In the case of assisted pressure regulation by means of the pump 31, it has to be taken into consideration that the motor 32 in the brake system taken as a basis here is provided also for operation of a corresponding pump of the brake circuit II. A precise control of the brake pressure p-circuit-1 and of a corresponding brake pressure of the brake circuit II cannot therefore be effected exclusively by means of the pumps. In combination with pressure regulation by means of the valve arrangement 71-73 and a corresponding valve arrangement of the brake circuit II the respective brake pressure p-circuit-1 may be precisely adjusted in both brake circuits also with partial pressure control using the pumps.

To optimize the pressure control, it is further provided that pressure sensors or comparable components are used to determine the pressure actually prevailing in each case, which is relevant to the output side of the valve arrangement 71-73 or exists there. This may be effected by means of one or more pressure sensors disposed directly at the output side of the valve arrangement 71-73. It is additionally or alternatively possible to dispose one or more pressure sensors at the output side of the pump 31 and/or in the wheel brakes 50, 60.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. A hydraulic brake system for a land vehicle comprising:
a control unit (ECU) that supplies control signals for controlling automatic braking operations of the brake system,
a master cylinder that has an output side for generating brake pressure under control of a driver, and
a first brake circuit (I) including:
a first controllable pump that has an output side for generating brake pressure in the first brake circuit (I) under control of the control unit (ECU), and
a first valve arrangement having an input side that is fluidically connected to the output side of the master cylinder and an output side that is fluidically connected to the output side of the first pump, wherein the first valve arrangement has an open operating state, in which the input side and the output side of the first valve arrangement are fluidically connected, and a closed operating state, in which the fluid connection between the input side and the output side of the first valve arrangement is blocked,
wherein the control unit (ECU) is devised such that during an automatic braking operation, it supplies first control signals for the first valve arrangement in order to bring the first valve arrangement in such a way into its open and closed operating states that a predetermined pressure is adjusted at the output side of the first valve arrangement,
characterized in that the control unit (ECU) is devised to provide second high-frequency control signals for the first valve arrangement, the first control signals and the second control signals superimposing each other.

2. A hydraulic brake system according to claim 1, wherein the control unit (ECU) is devised such that in response to the automatic braking operation control, it supplies control signals for the first valve arrangement in order to bring the first valve arrangement into its closed operating state for a first predetermined time period.

3. A hydraulic brake system according to claim 1, wherein the control unit (ECU) is devised such that during the automatic braking operation, it supplies a sequence of control signals for the first valve arrangement in order to bring the first valve arrangement alternately into its open and closed operating states.

4. A hydraulic brake system according to claim 1, wherein the control device (ECU) is devised such that during the automatic braking operation, it supplies control signals for the first valve arrangement at predetermined time intervals in order to bring the first valve arrangement into its closed operating state at the predetermined time intervals for a second predetermined time period.

5. A hydraulic brake system according to claim 1, wherein the first valve arrangement adopts its open operating state in the event of a predetermined upper pressure difference between its output side and its input side.

6. A hydraulic brake system according to claim 5, wherein the control unit (ECU) is devised such that it supplies control signals for the first valve arrangement in order to bring the first valve arrangement into its open operating state in the event of the predetermined upper pressure difference.

7. A hydraulic brake system according to claim 5, wherein the first valve device automatically adopts its open operating state in the event of the predetermined upper pressure difference.

8. A hydraulic brake system according to claim 1, wherein a pulse/interpulse period ratio of a pulse width modulation are adjusted or varied in accordance with predetermined signal characteristics, wherein the predetermined signal characteristics may be continuous and may present stepped changes, and wherein individual ones of the predetermined signal characteristics are linear, sinusoidal, rectangular, triangular, or saw-tooth.

9. A hydraulic brake system according to claim 1, wherein the control unit (ECU) is devised such that in response to an actuation of the brake system by a driver that indicates an actual braking request of the driver, it supplies control signals for the first valve arrangement in order to bring the first valve arrangement into its open operating state and supplies control signals for the brake system in order to terminate the automatic braking operation.

10. A hydraulic brake system according to claim 1, wherein the control unit (ECU) is devised such that in response to an actuation of the brake system by a driver that does not indicate an actual braking request of the driver, it supplies control signals for the first valve arrangement in order to bring the first valve arrangement in such a way into its open and closed operating states that a pressure change at the output side of the first valve arrangement because of brake pressures generated by the actuation of the brake system by the driver is prevented.

11. A hydraulic brake system according to claim 1, wherein the control unit (ECU) is devised such that during the automatic braking operation, it supplies control signals for the first pump in order to operate the first pump in dependence upon an actual pressure at the output side of the first valve arrangement.

12. A hydraulic brake system according to claim 1, having at least one pressure sensor which is capable of supplying pressure signals indicating an actual pressure at the output side of the first valve arrangement, and in which the control unit (ECU) is devised such that during the automatic braking operation, it supplies control signals for the first valve arrangement in order to bring the first valve arrangement into its open and closed operating states in dependence upon the pressure signals.

13. A hydraulic brake system according to claim 12, wherein the at least one pressure sensor is devised for pressure acquisition at the output side of the first pump.

14. A hydraulic brake system according to claim 12, wherein the at least one pressure sensor is devised for pressure acquisition at an input side or in a wheel brake of the brake system.

15. A hydraulic brake system according to claim 1 further including a second brake circuit (II) having a second controllable pump that has an output side for generating brake pressure in the second brake circuit (II) under the control of the control unit (ECU), and a second valve arrangement having an input side that is fluidically connected to the output side of the master cylinder, and an output side that is fluidically connected to the output side of the second pump, wherein the second valve arrangement has an open operating state, in which the input side and the output side of the second valve arrangement are fluidically connected, and a closed operating state, in which the fluid connection between the input side and the output side of the second valve arrangement is blocked, in which the control unit (ECU) is devised such that during the automatic braking operation, it supplies control signals for the first valve arrangement and the second valve arrangement in order to bring the first valve arrangement and the second valve arrangement in each case in such a way into their open and closed operating states that the predetermined pressure is adjusted at the output side of the first valve arrangement and at the output side of the second valve arrangement.

16. A method of controlling a hydraulic brake system for a land vehicle that includes a master cylinder that has an output side for generating brake pressure under the control of a driver, a first brake circuit (I) that includes a first controllable pump that has an output side for generating brake pressure in the first brake circuit (I) under the control of the control unit (ECU), and a first valve arrangement having an input side that is fluidically connected to the output side of the master cylinder and an output side that is fluidically connected to the output side of the first pump, wherein a fluid connection between the input side and the output side of the first valve arrangement may be established and blocked in a controlled manner, the method comprising the steps of:

controlling the first valve arrangement during an automatic braking operation by means of signals in order to establish and block the fluid connection between the input side and the output side of the first valve arrangement in such a way that a predetermined pressure is adjusted at the output side of the first valve arrangement characterized by controlling the first valve arrangement during an automatic braking operation by means of first and second signals at high frequency, the first and the second signals superimposing each other.

17. A method according to claim 16, wherein in response to the automatic braking operation, the fluid connection between the input side and the output side of the first valve arrangement is established for a first predetermined time period.

18. A method according to claim 16, wherein during the automatic braking operation, the fluid connection between the input side and the output side of the first valve arrangement is alternately established and blocked.

19. A method according to claim 16, wherein during the automatic braking operation, the fluid connection between the input side and the output side of the first valve arrangement is blocked at predetermined time intervals for a second predetermined time period.

20. A method according to claim 16, wherein the fluid connection between the input side and the output side of the first valve arrangement is established in the event of a predetermined upper pressure difference between the output side and the input side of the first valve arrangement.

21. A method according to claim 16, wherein in response to an actuation of the brake system by a driver that indicates an actual braking request of the driver, the fluid connection between the input side and the output side of the first valve arrangement is established and the automatic braking operation is terminated.

22. A method according to claim 16, wherein in response to an actuation of the brake system by a driver that does not indicate an actual braking request of the driver, the fluid connection between the input side and the output side of the first valve arrangement is established and blocked in such a way that a pressure change at the output side of the first valve arrangement as a result of brake pressures generated by the actuation of the brake system by the driver is prevented.

23. A method according to claim 16, wherein at least an actual pressure for the output side of the first valve arrangement is determined, and the fluid connection between the input side and the output side of the first valve arrangement is established and blocked in dependence upon the at least one actual pressure.

24. A method according to claim 23, wherein the at least one actual pressure is determined at the output side of the first pump.

25. A method according to claim 23, wherein the at least one actual pressure is determined at an input side or in a wheel brake of the brake system.

26. A method according to claim 16, wherein the brake system includes a second brake circuit (II) having a second controllable pump that has an output side for generating brake pressure in the second brake circuit (II) under the control of the control unit (ECU), and a second valve arrangement having an input side that is fluidically connected to the output side of the master cylinder and an output side that is fluidically connected to the output side of the second pump, wherein a fluid connection between the input side and the output side of the second valve arrangement may be established and blocked in a controlled manner, and including the step of:

controlling the first valve arrangement and the second valve arrangement during an automatic braking operation in order to establish and block the fluid connection between the input side and the output side of the first valve arrangement and the fluid connection between the input side and the output side of the second valve arrangement in such a way that the predetermined pressure is adjusted at the output side of the first valve arrangement and at the output side of the second valve arrangement.

* * * * *